(12) United States Patent
Fetty

(10) Patent No.: US 11,832,602 B1
(45) Date of Patent: Dec. 5, 2023

(54) MAGNETIC HOOK KEEPER

(71) Applicant: Zebco Holdings, LLC, Tulsa, OK (US)

(72) Inventor: Shane Anthony Fetty, Owasso, OK (US)

(73) Assignee: ZEBCO HOLDINGS, LLC, Tulsa, OK (US)

( * ) Notice: Subject to any disclaimer, the term of this patent is extended or adjusted under 35 U.S.C. 154(b) by 71 days.

(21) Appl. No.: 17/221,112

(22) Filed: Apr. 2, 2021

(51) Int. Cl.
*A01K 87/00* (2006.01)
*A01K 87/08* (2006.01)

(52) U.S. Cl.
CPC ............ *A01K 87/08* (2013.01); *A01K 87/007* (2013.01)

(58) Field of Classification Search
CPC ...... A01K 97/00; A01K 97/06; A01K 87/007; A01K 87/009; A01K 87/08
See application file for complete search history.

(56) References Cited

U.S. PATENT DOCUMENTS

| | | | | |
|---|---|---|---|---|
| 3,815,273 A | * | 6/1974 | Perkins | A01K 97/06 43/25.2 |
| 4,276,711 A | * | 7/1981 | Mathauser | A01K 97/125 43/17 |
| 5,031,827 A | * | 7/1991 | von Braunhut | F41B 15/022 463/47.7 |
| 5,193,298 A | * | 3/1993 | O'Neill | A01K 91/02 43/19 |
| 6,594,942 B1 | * | 7/2003 | Sherwood | A01K 87/007 43/17.5 |
| 2014/0298708 A1 | * | 10/2014 | Arola | A01K 87/025 43/24 |
| 2015/0201600 A1 | * | 7/2015 | Ciari | A01K 91/02 43/4.5 |
| 2018/0103630 A1 | * | 4/2018 | Huber | A01K 97/06 |

FOREIGN PATENT DOCUMENTS

JP         2014173729 A   *   9/2014  ............... F16B 7/04

* cited by examiner

*Primary Examiner* — Joshua E Rodden
*Assistant Examiner* — Henry Hooper Mudd
(74) *Attorney, Agent, or Firm* — James F. Lea, III; Gable Gotwals

(57) ABSTRACT

A fishing rod has a rod portion and a handle portion separated by a reel seat. At least one portion defines a magnet receiving area, which may be external or within a hollow portion that is surrounded by a wall and that is located in the rod portion, the reel seat portion, or in the handle portion for receiving a spacer piece. The spacer piece may be cylindrical shaped and made of foam. The spacer piece defines a receiving cavity for receiving a magnet. In one embodiment, the receiving cavity is asymmetrically oriented in the spacer piece such that the receiving cavity has a close side that is a first distance from the wall and has a far side that is a second distance from the wall for locating an area of best magnetic attraction at a predetermined location on an exterior of the rod portion or handle portion.

17 Claims, 3 Drawing Sheets

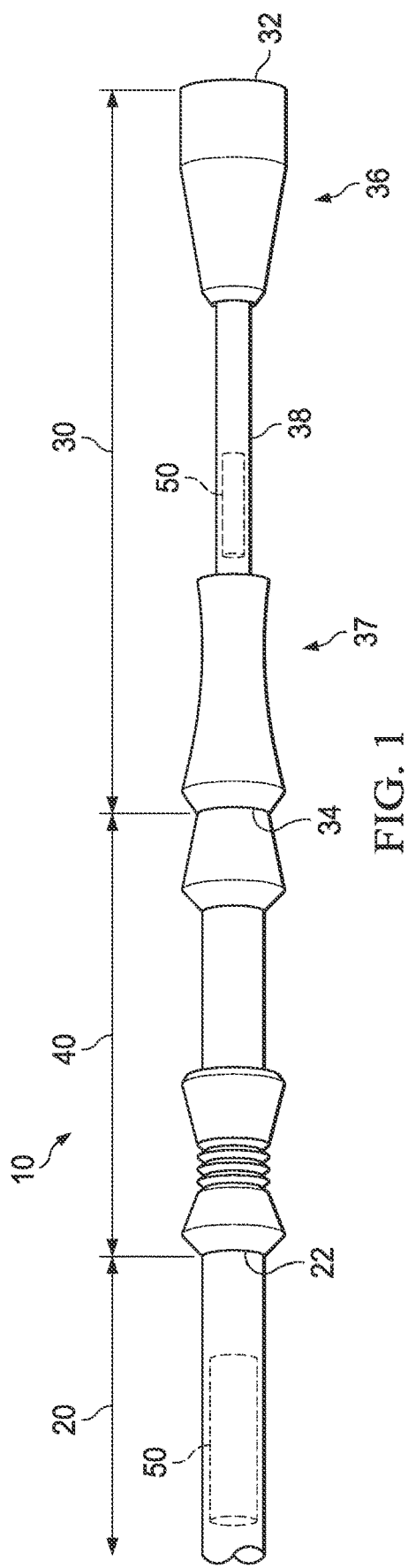
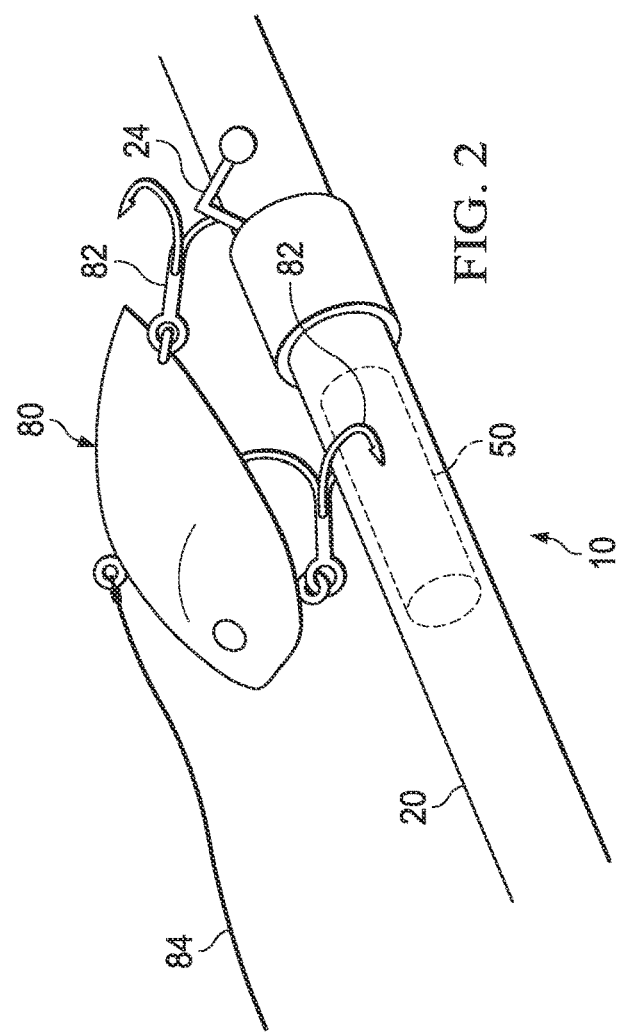

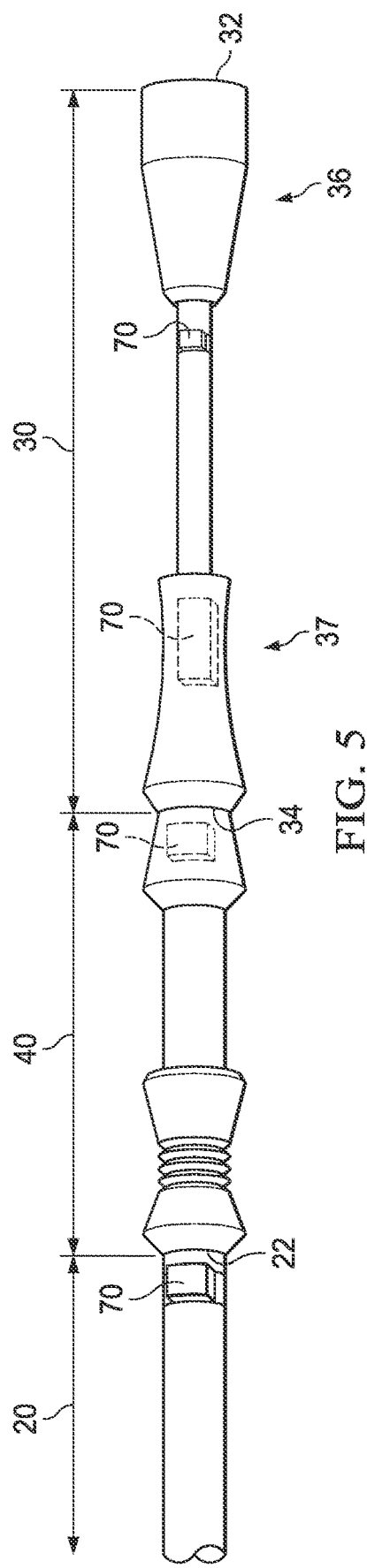
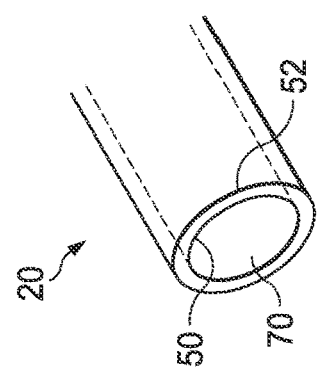

MAGNETIC HOOK KEEPER

FIELD OF THE INVENTION

The present invention relates to fishing rods. More particularly, the invention relates to a fishing rod having a magnet for securing a metallic object, such as a treble hook affixed to a lure.

BACKGROUND OF THE INVENTION

Fishing rods typically include a handle portion and a rod portion separated by a reel seat. The reel seat is provided for receiving a reel of various types for storing fishing line. The fishing line typically exits the reel and passes through a series of line guides on the rod portion before exiting from the tip of the rod portion. A hook or lure is typically affixed to a terminal end of the fishing line. A hook keeper may be provided on the reel seat portion adjacent to the rod for receiving the hook for facilitating ease of transport of the fishing rod. However, some lures may have multiple hooks that extend therefrom. Consequently, a traditional hook keeper may secure only a single hook, allowing for a second hook or treble hook assembly to freely dangle from the secured reel, which presents a potential for snagging or otherwise causing inconvenience when transporting a fishing rod.

SUMMARY OF THE INVENTION

A fishing rod of the invention has a rod portion and a handle portion separated by a reel seat. A magnet is received at a magnet receiving area in the rod portion, the handle portion, or the reel seat. The magnet receiving area may be inside the rod blank, part of a handle grip, on the reel seat, or mounted externally to one of the above. In one embodiment, at least one of the handle portion and the rod portion defines a hollow portion that is surrounded by a wall. The wall may have a wall thickness of 10 mm or less.

In one embodiment, the hollow portion is in the rod portion between a midpoint of the rod portion and the reel seat.

In another embodiment, the hollow portion is in the handle portion. The handle portion defines a base end and a reel seat end. The handle portion may have a first grip area and a second grip area separated by a clip area, wherein the hollow portion is in the clip area.

In one embodiment, a spacer piece is received in the hollow portion. The spacer piece may be cylindrically shaped and made of foam. The spacer piece defines a receiving cavity for receiving a magnet. In one embodiment, the receiving cavity is asymmetrically oriented in the spacer piece such that the receiving cavity has a close side that is a first distance from the wall and has a far side that is a second distance from the wall for locating an area of best magnetic attraction at a predetermined location on an exterior of the rod portion or handle portion.

In one embodiment, the magnet is secured within the hollow portion with tape that surrounds the magnet, with glue surrounding the magnet, or via friction fit within a hollow portion of the handle portion, reel seat portion or rod portion.

The magnet preferably has a length of between 10 mm and 200 mm and a diameter for between 5 mm and 15 mm. The magnet is preferably a cylinder magnet that is diameter magnetized.

The magnet preferably has a strength such that it produces between 1 and 10 lbs of force, more preferably 3 and 7 lbs force and most preferably 5 lbs force.

BRIEF DESCRIPTION OF THE DRAWINGS

FIG. 1 is an elevation view of a rod of a fishing reel showing hollow area for receiving a magnet;

FIG. 2 is an enlarged view of a portion of the rod of FIG. 1;

FIG. 5 is an elevation view of a rod of a fishing reel showing alteration and external magnet receiving areas;

FIG. 6 is a cutaway view of a portion of the rod of FIG. 1 showing a magnet received therein either by friction fit or surrounded by glue or tape.

DETAILED DESCRIPTION OF THE PREFERRED EMBODIMENTS

Figure 3:
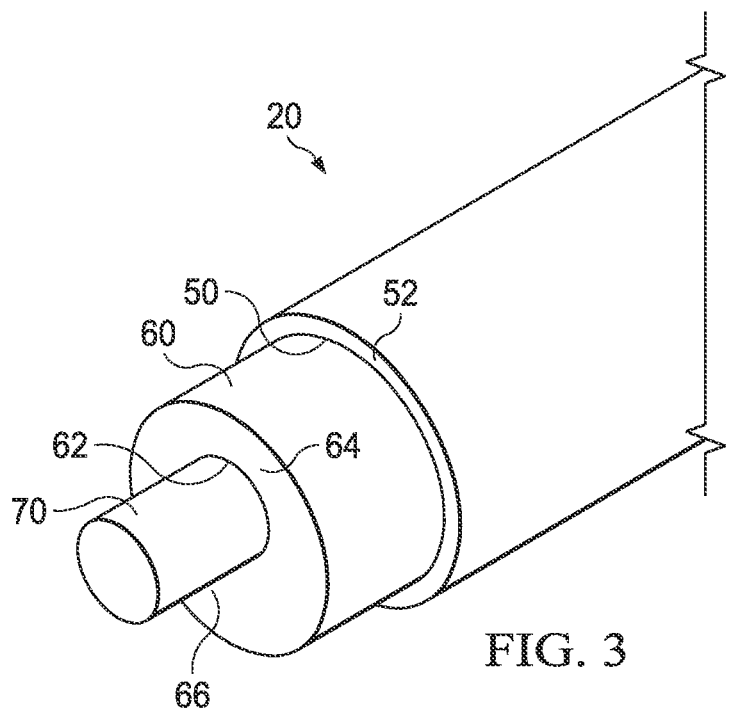
FIG. 3 is a cutaway view of a portion of the rod of FIG. 1 showing a magnet and spacer piece within the rod.
Figure 4:
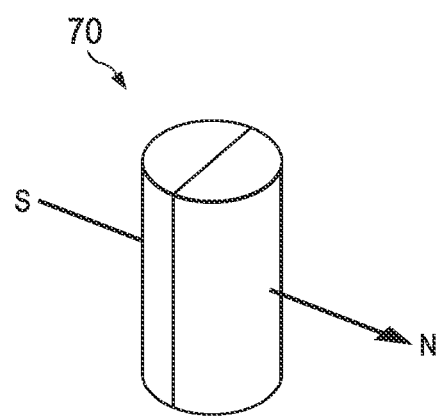
FIG. 4 is a perspective view of the magnet of FIG. 3.

Referring now to the figures, shown is a fishing rod designated generally 10. Fishing rod 10 includes a rod portion 20 and a handle portion 30 separated by a reel seat 40. Real seat 40 is provided for receiving a fishing reel.

At least one of handle portion 30, reel seat 40, and rod portion 20 defines hollow area 50. Hollow area 50 is surrounded by a wall 52. Wall 52 preferably has a thickness of 10 mm or less.

Rod portion 20 has a reel seat end 22, a tip end, and a mid-point halfway between reel seat end 22 and the tip end. Rod portion 20 may be provided with a hook loop 24 (FIG. 2).

In one embodiment, hollow area 50 is located in rod portion 20 adjacent to reel seat 40. In a second embodiment, hollow area 50 is located in handle portion 30. In one embodiment, hollow area 50 is in rod portion 20 between the mid-point of rod portion 20 and reel seat end 22.

Handle portion 30 defines base end 32 and reel seat end 34. In one embodiment, handle portion 30 has first grip area 36 and second grip area 37 that are separated by clip area 38. In one embodiment, hollow area 50 is located in handle portion 30 in clip area 38.

In one embodiment, spacer piece 60 is received in hollow area 50. Spacer piece 60 may be formed of foam. Spacer piece 60 defines receiving cavity 62. Spacer piece 60 is preferably cylindrically shaped for being received in hollow portion 50. Receiving cavity 62 may be asymmetrically oriented in spacer piece 60 such that receiving cavity 62 defines a close side that is a first distance 64 from wall 52. Spacer piece 60 has a far side that is a second distance 66 from wall 52.

In one embodiment, magnet 70 is received in receiving cavity 62 of spacer piece 60. Magnet 70 preferably has a length of between 10 mm and 200 mm. Preferably, magnet 70 is a cylinder magnet that is diameter magnetized. Magnet 70 preferably has a diameter of between 5 mm and 15 mm. In a preferred embodiment, magnet 70 produces one to 10 pounds of attractive force, more preferably, 3 to 7 pounds of attractive force, and most preferably, approximately 5 pounds of force.

In one embodiment, magnet 70 is received in hollow area 50 of rod portion 20, reel seat portion 40 or handle portion 30. Magnet 70 may be received on or in reel seat 40, on or in grip area 36 or 37 or located in other magnet receiving areas such as externally on rod portion 20 or handle portion 30 (see, e.g., FIG. 5).

Magnet 70 may be surrounded by glue, surrounded by tape, or received via friction fit within hollow area 50 (see, e.g., FIG. 6).

As shown in FIG. 2, magnet 70 may beneficially attract and hold metallic objects, such as lure 80 via, e.g., hook structures 82. One advantage is that, for lures having multiple hook structures 82, one hook structure may be received within hook loop 24 and a second hook structure 82 may be secured by magnet 70.

Although particular embodiments have been described herein, it will be appreciated that the invention is not limited thereto and that many modifications and additions thereto may be made within the scope of the invention. For example, various combinations of the features of the following dependent claims can be made with the features of the independent claims without departing from the scope of the present invention.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A fishing rod comprising:
a rod portion and a handle portion separated by a reel seat;
wherein at least one of said handle portion, said reel seat, and said rod portion defines a hollow portion;
a magnet received in said hollow portion;
wherein said hollow portion is surrounded by a wall; and
wherein said magnet is of sufficient strength to attract and hold a hook positioned adjacent said magnet and external to said wall;
said handle portion is adjacent to said reel seat;
said handle portion defines a base end and a reel seat end, said handle portion having a first grip area and a second grip area separated by a clip area;
wherein said hollow portion is in said clip area.

2. The fishing rod according to claim 1 wherein:
said wall surrounding said hollow portion has a wall thickness of 10 mm or less.

3. The fishing rod according to claim 1 wherein:
wherein said hollow portion is in said rod portion between a midpoint of said rod portion and said reel seat.

4. The fishing rod according to claim 1 wherein:
wherein said hollow portion is in said handle portion.

5. A fishing rod comprising:
a rod portion and a handle portion separated by a reel seat;
wherein at least one of said handle portion, said reel seat, and said rod portion defines a hollow portion;
a magnet received in said hollow portion;
wherein said hollow portion is surrounded by a wall; and
wherein said magnet is of sufficient strength to attract and hold a hook positioned adjacent said magnet and external to said wall;

a spacer piece matingly received within said wall of said hollow portion, said spacer piece defining a receiving cavity;

wherein said magnet is received in said receiving cavity of said spacer piece.

6. The fishing rod according to claim 5 wherein:

said spacer piece is cylindrical shaped.

7. A fishing rod comprising:

a rod portion and a handle portion separated by a reel seat;

wherein at least one of said handle portion, said reel seat, and said rod portion defines a magnet receiving area;

a magnet received in said magnet receiving area;

said magnet receiving area is a hollow portion, wherein said hollow portion is surrounded by a wall;

a spacer piece received in said hollow portion, said spacer piece defining a receiving cavity;

wherein said magnet is received in said receiving cavity of said spacer piece;

said spacer piece is comprised of foam.

8. The fishing rod according to claim 5 wherein:

said spacer piece having a cylindrical shape;

said receiving cavity is asymmetrically oriented in said spacer piece such that said receiving cavity has a close side that is a first distance from said wall and has a far side that is a second distance from said wall.

9. A fishing rod comprising:

a rod portion and a handle portion separated by a reel seat;

wherein at least one of said handle portion, said reel seat, and said rod portion defines a hollow portion;

a magnet received in said hollow portion;

wherein said hollow portion is surrounded by a wall; and wherein said magnet is of sufficient strength to attract and hold a hook positioned adjacent said magnet and external to said wall;

said handle portion comprises a handle grip; and wherein a magnet receiving area is located within said hollow portion of said handle grip.

10. The fishing rod according to claim 1 wherein:

said magnet has a longitudinal axis that is aligned with a longitudinal axis of said rod portion;

said magnet has a length of between 10 mm and 200 mm.

11. A fishing rod comprising:

a rod portion and a handle portion separated by a reel seat;

wherein at least one of said handle portion, said reel seat, and said rod portion defines a hollow portion;

a magnet received in said hollow portion;

wherein said hollow portion is surrounded by a wall; and wherein said magnet is of sufficient strength to attract and hold a hook positioned adjacent said magnet and external to said wall;

said magnet is a cylinder magnet that is diameter magnetized;

wherein a longitudinal axis of said cylinder magnet is aligned with a longitudinal axis of said rod portion.

12. The fishing rod according to claim 1 wherein:

said magnet has a diameter of between 5 mm and 15 mm.

13. The fishing rod according to claim 1 wherein:

said magnet produces between 1 and 10 lbs. force.

14. The fishing rod according to claim 13 wherein:

said magnet produces between 3 and 7 lbs. force.

15. The fishing rod according to claim 1 wherein said magnet is secured within said hollow portion via friction fit.

16. The fishing rod according to claim 1 wherein said magnet is secured within said hollow portion via tape.

17. The fishing rod according to claim 1 wherein said magnet is secured within said hollow portion via glue.

* * * * *